US009858257B1

(12) United States Patent
Hamaker et al.

(10) Patent No.: US 9,858,257 B1
(45) Date of Patent: Jan. 2, 2018

(54) DISTINGUISHING INTENTIONAL LINGUISTIC DEVIATIONS FROM UNINTENTIONAL LINGUISTIC DEVIATIONS

(71) Applicant: Amazon Technologies, Inc., Seattle, WA (US)

(72) Inventors: Janna S. Hamaker, Seattle, WA (US); Sravan Babu Bodapati, Andhra Pradesh (IN); John Hambacher, Redmond, WA (US); Gururaj Narayanan, Karnataka (IN); Sriraghavendra Ramaswamy, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/215,504

(22) Filed: Jul. 20, 2016

(51) Int. Cl.
  *G06F 17/27* (2006.01)
  *G06F 17/24* (2006.01)
  *G06N 99/00* (2010.01)
  *G06N 7/00* (2006.01)

(52) U.S. Cl.
  CPC .......... *G06F 17/273* (2013.01); *G06F 17/241* (2013.01); *G06F 17/274* (2013.01); *G06F 17/275* (2013.01); *G06F 17/2785* (2013.01); *G06N 7/005* (2013.01); *G06N 99/005* (2013.01)

(58) Field of Classification Search
  None
  See application file for complete search history.

(56) References Cited

U.S. PATENT DOCUMENTS

| 5,748,807 | A  | * | 5/1998 | Lopresti | G06K 9/03 382/310 |
| 6,782,510 | B1 | * | 8/2004 | Gross | G06F 17/274 704/10 |
| 8,515,894 | B2 | * | 8/2013 | Yu | H04L 12/585 706/52 |

(Continued)

OTHER PUBLICATIONS

Sørensen, Lars Tabro, and Martin Møller Larsen. "WordAdjust—A Deobfuscation Frontend to Content-Aware Anti-Spam Tools." (2008).*

*Primary Examiner* — Jialong He
(74) *Attorney, Agent, or Firm* — Lee & Hayes, PLLC

(57) ABSTRACT

A machine learning engine may correlate contextual information associated with a misspelling in a publication with a likelihood that the misspelling is intentional in nature. Training data may be generated by analyzing one or more past publication to identify misspellings and labeling the misspellings as intentional. A contextual indicators application may analyze the context in which intentional misspellings have been previously included within publication to identify indicators of future misspellings being intentional. A machine learning engine may use the training data and indicators to generate an intentional linguistic deviation (ILD) prediction model to determine whether a new misspelling is an intentional misspelling. The machine learning engine may also determine weights for individual indicators that may calibrate the influence of the respective individual indicators. The ILD prediction model may be deployed to analyze a new publication to identify a likelihood of the new misspelling being intentional.

20 Claims, 6 Drawing Sheets

(56) References Cited

U.S. PATENT DOCUMENTS

| | | | | |
|---|---|---|---|---|
| 8,527,602 | B1* | 9/2013 | Rasmussen | H04N 21/44026 709/207 |
| 2004/0260776 | A1* | 12/2004 | Starbuck | G06Q 10/107 709/206 |
| 2005/0091030 | A1* | 4/2005 | Jessee | G06F 17/26 704/4 |
| 2005/0262209 | A1* | 11/2005 | Yu | H04L 51/28 709/206 |
| 2006/0047760 | A1* | 3/2006 | Encinas | G06Q 10/107 709/206 |
| 2006/0241944 | A1* | 10/2006 | Potter | G06F 17/2795 704/254 |
| 2008/0028029 | A1* | 1/2008 | Hart | G06Q 10/107 709/206 |
| 2009/0164890 | A1* | 6/2009 | Zhu | G06F 17/273 715/257 |
| 2010/0205123 | A1* | 8/2010 | Sculley | H04L 63/1408 706/12 |
| 2012/0262461 | A1* | 10/2012 | Fisher | G06F 17/276 345/467 |
| 2014/0188460 | A1* | 7/2014 | Ouyang | G06F 17/2735 704/9 |

* cited by examiner

DISTINGUISHING INTENTIONAL LINGUISTIC DEVIATIONS FROM UNINTENTIONAL LINGUISTIC DEVIATIONS

BACKGROUND

A book retailer may improve the quality of its product offerings by independently reviewing books and informing publishers of identified errors. Spelling errors are among the more common types of errors identified and reported to publishers. With recent increases in independent publishers and even self-published electronic books (eBooks), it has become impracticable for publications to be subjected uniformly to human review prior to being distributed to end consumers. Accordingly, automatic linguistic checking systems may be used to identify and flag spelling, grammar, and punctuation errors within a document prior to publication.

Although eliminating inadvertent linguistic errors is generally a desirable goal, many authors intentionally misspell words, or include other linguistic deviations, for a variety of reasons such as, for example, to exhibit a particular character's accent in a dialogue or to onomatopoetically spell out a natural sound. Thus, informing publishers of every linguistic deviation (e.g. spelling or grammar deviations) identified in a document may over-inclusively return even intentional linguistic deviations, e.g. words intentionally spelled incorrectly or fictitious words that exist only in the publication. Unnecessarily prompting a publisher to review intentional linguistic deviations may detract from the publisher's ability to adequately address inadvertent linguistic errors that are actually deserving of correction or, worse yet, may frustrate the publisher into disregarding the notifications altogether.

Although resources exist to perform linguistics checking in a document, such as an automatic spell checking system integrated into word processing software, these resources lack the ability to determine whether an author has intentionally misspelled words.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
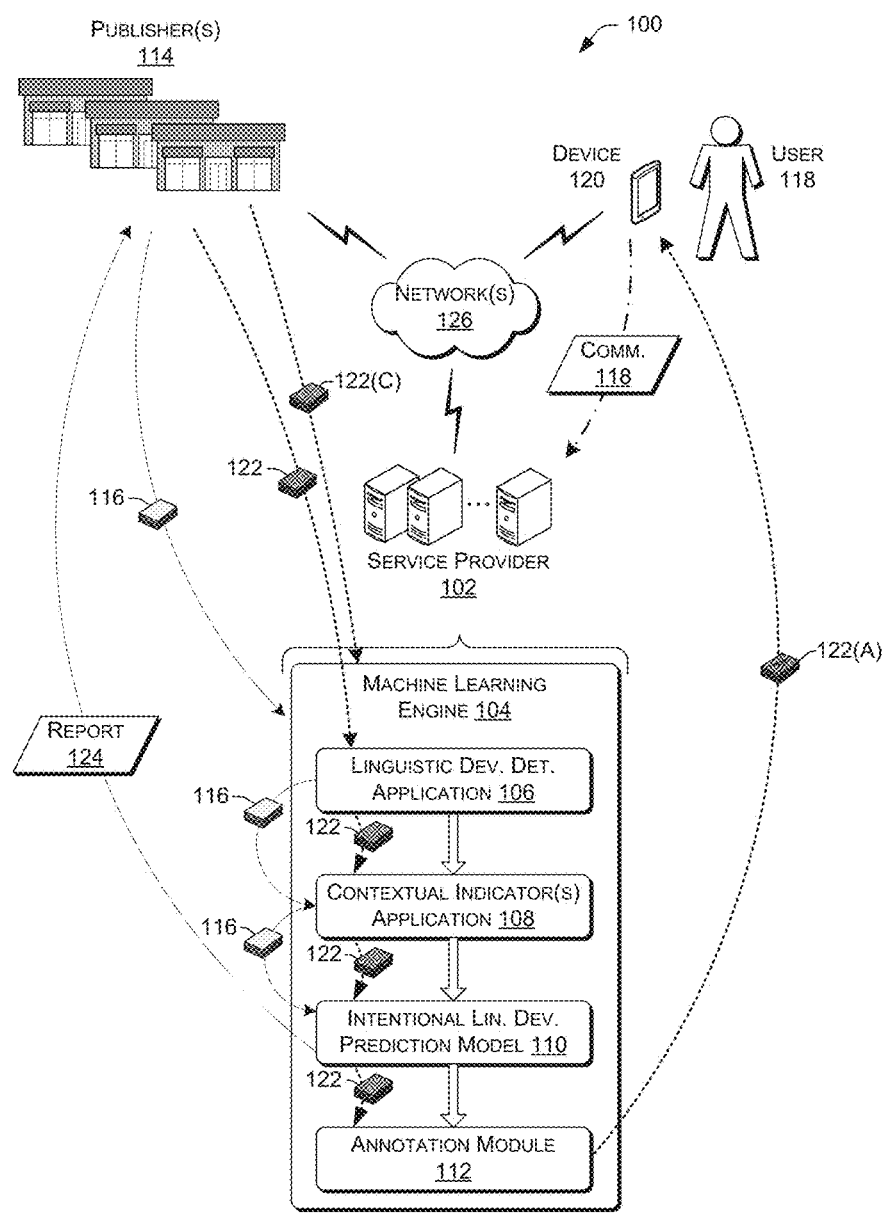
FIG. 1 is a schematic diagram of an illustrative computing environment usable to distinguish intentional linguistic deviations from unintentional linguistic deviations using machine learning.

This disclosure is directed to using a machine learning engine to correlate contextual data associated with instances of words being identified by a computerized linguistic analysis system as being a deviation from linguistic norms, referred to herein as "linguistic deviations" or simply "deviations," with a likelihood that that particular ones of the linguistic deviations are intentional in nature. A linguistic deviation detection application may determine historic linguistic deviation data, referred to herein as "HLD data," corresponding to a number of linguistic deviations identified from past publications and may also determine whether such linguistic deviations are unintentional (e.g. the author is unaware of a linguistic deviation) or intentional (e.g. a linguistic deviation is included for literary effect). A contextual indicator application may access contextual data of the past publications that is associated with the linguistic deviations. Exemplary contextual data may include indentation data, e.g. formatting within an electronic word document file, or punctuation data, e.g. an inclusion of particular punctuation elements/characters in proximity to an intentional linguistic deviation ("ILD"). The HLD data and/or the contextual data may be used as training data to create an intentional linguistic deviations prediction model, referred to herein as "ILD prediction model." In particular, the machine learning engine may process the HLD data and the contextual data to create an ILD prediction model to predict whether linguistic deviations identified in new publications are intentional or unintentional.

In creating the ILD prediction model, the HLD data and the contextual data may be processed by the machine learning engine to identify data instances, referred to herein as "indicators," that have a strong correlation with an identified linguistic deviation being an ILD or, alternatively, an unintentional linguistic deviation (ULD). As described in more detail below, the indicators may include indentation style, formatting style, salutations, extended repeated letters, capitalization technique (e.g. all caps), a frequency of the misspellings in the publication, the misspellings being enclosed in quotations, and/or other data events associated with an intentional nature (or unintentional nature) of particular misspellings. In some embodiments, at least some of the HLD data may be captured by end consumers and reported to a service provider, e.g. a retailer of publications. In various embodiments, the machine learning engine may determine weights for individual indicators. The weights may calibrate or apportion the influence of the respective individual indicators in the ILD prediction model. The ILD prediction model may be deployed to analyze newly identified linguistic deviations and contextual data corresponding thereto to identify a likelihood of individual newly identified linguistic deviations being ILDs or ULDs. Based on these findings a linguistic deviation report may be generated that flags ULDs so that they can be appropriately corrected but does not flag ILDs so as to not report on items which do not need to be corrected. Thus, a linguistic deviation report developed from the ILD prediction model is neither over-inclusive nor under-inclusive. The ILD prediction model may be updated over time by the machine learning engine as data correlations evolve over time.

In some embodiments, one or more weighing factors apportion negative influence such that the presence of corresponding indicators lowers the ILD probability score while one or more other weighting factors apportion positive influence such that the presence of corresponding indicators increases the ILD probability score. For example, a first weighting factor may cause a first indicator to increase the ILD probability score for a particular deviation by a first amount X (e.g. 75%) whereas a second weighting factor may cause a second indicator to decrease the ILD score for the particular deviation by a second amount Y (e.g. 15%) such that the ILD score is X-Y (e.g. 60%).

In some embodiments, an annotation module may annotate a publication with metadata that identifies ILDs. Metadata may indicate reasons why the machine learning engine identified any particular linguistic deviation as intentional, i.e. as an ILD. In some embodiments, the annotation module may automatically replace ULDs if correct or intended linguistics are ascertainable. For example, if the phrase "He was always to anxious to perform under the Friday night lights" is analyzed the first occurrence of the word "to," i.e. the underlined "to," may be replaced with the correct word "too." Thus, an annotated version of a publication may be created which includes corrections of ULDs so that an end consumer of the publication is not disrupted by their presence (e.g. identifying misspellings or grammatical mistakes may bother an end consumer) and also metadata which explains to the end consumer respective purposes for ILDs identified by the ILD prediction model. In some instances, the metadata may cause a device (e.g. an eBook, tablet device, smart phone, etc.) to flag the ILDs while displaying the publication. For example, an electronic reader may display ILDs as underlined and, upon an underlined word being selected by a user, the electronic reader may display the metadata to the user.

The techniques and systems described herein may be implemented in a number of ways. Example implementations are provided below with reference to the following figures.

FIG. 1 is a schematic diagram of an illustrative computing environment 100 usable to distinguish intentional linguistic deviations (ILDs) from unintentional linguistic deviations (ULDs) using machine learning. The environment 100 includes a service provider 102. The service provider 102 may be a manager of an online retailer which may include at least some eBooks within its product catalog. The product catalog may be accessible by the user 120 via the device 118 by accessing an online marketplace (e.g., a website, a mobile application, etc.). The service provider 102 may also manage electronic storefronts for one or more publishers, e.g. the publishers may offer publications via a customized storefront running on one or more servers of the service provider 102. The service provider 102 includes a machine learning engine 104 to create and/or deploy one or more of a linguistic deviation detection application 106, a contextual indicators application 108, an ILD prediction model (IMP model) 110, and an annotation module 112. In some embodiments, the ILD prediction model 110 may be created by employing supervised learning wherein one or more human expert assists in generating labeled training data. For example, a human expert such as an author, an editor, or other type of human reviewer may label ILDs and/or ULDs within past publication to be used as training data for the machine learning engine 104 to extract correlations from. Other machine learning techniques may also be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on. In accordance with one or more embodiments, the service provider 102 may receive, from one or more publishers 114, one or more past publications 116 that include linguistic deviations, some of which have been intentionally included in various contexts and some of which are inadvertent. Exemplary linguistic deviations may include misspellings (e.g. words that do not match a database of known words or text strings, punctuation errors (e.g. the inclusion of a question mark following a statement as opposed to a question), or grammar errors (e.g. violating rules of grammar and/or using a correctly spelled word in an incorrect context—"to" rather than "too"). In some instances, the past publications 116 may include (either upon receipt or upon analysis by the service provider 102) both HLD data that identifies past ILDs and also contextual data corresponding to a context or purpose of the past ILDs. In some instances, HLD data may be provided by the publisher 114 along with the past publications 116. For example, a publisher 114 may provide an electronic version of a past publication 116 which includes indications as to which words and/or phrases therein are and/or include ILDs. In some instances, contextual data may be provided by the publisher 114 with the past publications 116. For example, a publisher 114 may provide the publications in an electronic format that includes punctuation data and indentation data. In some instances, HLD data and/or contextual data may be added to training data by the service provider 102 in response to a communication 118 received from a device user 118 via an electronic device 120. For example, the user 118 may report a misspelling in a publication to the service provider 102 (e.g. due to the service provider being a publication retailer in some implementations) and, upon determining that the misspelling is intentional, training data may be expanded accordingly.

In some embodiments, the past publications 116 and the corresponding HLD data and contextual data thereof may be used by the contextual indicator application 108 to create training data to build the ILD prediction model 110. For example, HLD data may indicate that a particular word is an intentional misspelling and corresponding contextual data may indicate that the particular word is enclosed within quotation marks and preceded by the text indicating a character of a book is speaking in a particular context, e.g. while hurried with a full mouth. For example, the past publication 116 may recite as follows in hypothetical text block 1 ("hypo 1"):

While scarfing down the bagel Sally turned up the driveway and barked at Harry, "No, ahm not gon take the 'ard wast to the curb. Ahm reary late for work, anyways your legs broke?"

Hypo. 1

As shown in hypo 1, the HLD data may indicate the several misspellings (e.g. the misspellings may be squiggly underlined as shown above and/or flagged with metadata) and the contextual data may include data indicating that the misspellings have been intentionally included to add effect to the publication 116. The contextual indicators application 108 may output or otherwise make data (e.g., training data) accessible to enable building of the ILD prediction model 110, using the machine learning engine 104. Specifically, the contextual indicators application 108 may analyze the contextual data surrounding ILDs, i.e. the intentionally misspelled words, to identify various indictors that correlate with the intentional nature thereof. For example, the contextual indicators application 108 may determine that the three lines of hypo 1 include a notably higher percentage of misspellings than the average for the entire publication and may identify this as correlating with intentional misspellings, i.e. several misspellings being in close proximity (e.g. within X number of words or Y number of lines) may be an indicator that they are intentional. Continuing with this example, the contextual indicators application 108 may also determine that the string "Sally . . . barked at Harry, " . . . " indicates a transcribed dialogue which correlates with a high likelihood of misspellings (or other linguistic deviations) identified within the quotation marks being intentional, e.g. authors frequently transcribe dialogue portions more onomatopoetically than other non-dialogue portions of a publication. With particular reference to hypo 1, it will be appreciated that the instances of "ahm" are included to onomatopoetically indicate how Sally has pronounced the intended word of "I'm."

In some instances, the linguistic deviation detection application 106 (LDD application) and/or the contextual indicators application 108 may prompt the service provider 102 and/or the publisher 114 to indicate whether a linguistic deviation that has yet to be labeled as intentional or unintentional is to be classified or labeled as intentional or unintentional for the purpose of building upon available training data. For example, the service provider 102 may be prompted to indicate an intentional/unintentional nature of a particular word that has been identified as a misspelling but has yet to be classified as an intentional misspelling or an unintentional misspelling. Then, contextual indicator application 108 may analyze the surrounding context of the newly classified misspelling to determine one or more indicators for use in the ILD prediction model 110.

The machine learning engine 104 may deploy the ILD prediction model 110 to analyze a new publication 122 received from the publisher(s) 114. In some instances, the machine learning engine 104 may run the LDD application 106 to detect all linguistic deviations within the new publication 122 (i.e. both intentional linguistic deviations and unintentional linguistic deviations). The contextual indicators application 108 may analyze the context (if any) in which the identified linguistic deviations have been included to determine indicators usable within the ILD prediction model 110 to determine a likelihood that individual ones of the identified linguistic deviations are intentional in nature, i.e. ILDs. In particular, indicator(s) that correlate with ILDs in the past publications 116 and which also correspond to a newly identified linguistic deviations may be used by the machine learning engine 104 in the ILD prediction model 110 to calculate ILD probability scores. In some instances, ILD probability scores for individual linguistic deviations may be compared to a threshold score.

Based on the results of the ILD prediction model 110, the service provider 102 may transmit a report 122 to the publisher(s) 114 to report on findings of the machine learning engine 104. In some instances, linguistic deviations with an ILD probability score above the threshold score are omitted from the report 124. Thus, the service provider 102 may refrain from reporting linguistic deviations which are likely to be ILDs based on the ILD probability score reaching and/or exceeding the threshold score and, therefore, may reduce and/or eliminate instances of over-inclusive reporting. In some instances, the service provider 102 may report on all linguistic deviations but may also include either the ILD probability scores for the linguistic deviations and/or may indicate for linguistic deviations with an ILD probability score above the threshold that the service provider 102 has identified the linguistic deviations but believes it to be intentional. Thus, the service provider 102 may report on all linguistic deviations while communicating to the publisher(s) the results of the ILD prediction model 110. In some instances, the publisher(s) 114 may respond to the report 122 with a corrected version 122(C) of the new publication 122.

The machine learning engine 104 may build the ILD prediction model 110 and update or revise the ILD prediction model 110 as data evolves over time. The HLD data and corresponding contextual data may be analyzed by the machine learning engine 104 to determine indicators (i.e., specific data) that have strong correlations with ILDs (e.g., misspellings occurring within quotations and/or preceded by salutations, a particular misspelling occurring frequently throughout the publication, etc.). As various indicators may exhibit stronger correlations with ILDs than other indicators, the machine learning engine 104 may determine weights (e.g. weighting factors) that apportion an influence of each of the indicators with respect to other indicators. The machine learning engine 104 may generate the ILD prediction model 110 using the indicators and weights, which work as a function to create an ILD probability score that indicates a likelihood that a particular linguistic deviation identified in a publication is an ILD and/or an ULD. However, the ILD prediction model 110 may also be implemented without the use of weights.

The machine learning engine 104 may deploy the annotation module 112 to annotate the new publication 122 with informative metadata thereby creating an annotated version 122(A) of the new publication 122 that may be transmitted to the device 120 for consumption by the user 118. In some instances, the annotated version 122(A) may include metadata which causes the device 120 to inform the user 118 that a linguistic deviation is intentional and/or explain the apparent purpose of including the ILD. For example, the new publication 122 may recite as follows in hypothetical text block 2 ("hypo 2"):

Deer Gorge,
I am so sad the puppy got hurt and wish could take it back but have forgiven myself. I hope for you two forgive me two.
Lenny.
Hypo. 2

As shown in hypo 2, the word "two" appears once as a misspelling for the word "to" and once as a misspelling for the word "too." By deploying the contextual indicators application 108, the machine learning engine 104 may have observed that dialogue associated with the character Lenny contains a large amount of similar grammatical errors (e.g. multiple misuses of the word "two") and may determine that such grammatical errors are intentionally included to convey a degree of intelligence of this character. The annotated version 122(A) may be include metadata which causes the device 120 to display the text as shown above (e.g. underlined) or with some other indication to the user and, upon being selected by the user, may explain the purpose of the grammatical errors, e.g. a window may temporarily pop up to explain the purpose.

The service provider 102 may exchange data with user devices, such as the user device 120, the publisher(s) 114, and/or any other entities described herein via one or more networks 126. The networks may be wired or wireless networks that facilitate exchange of data, request, and/or other information or signals.

Figure 2:
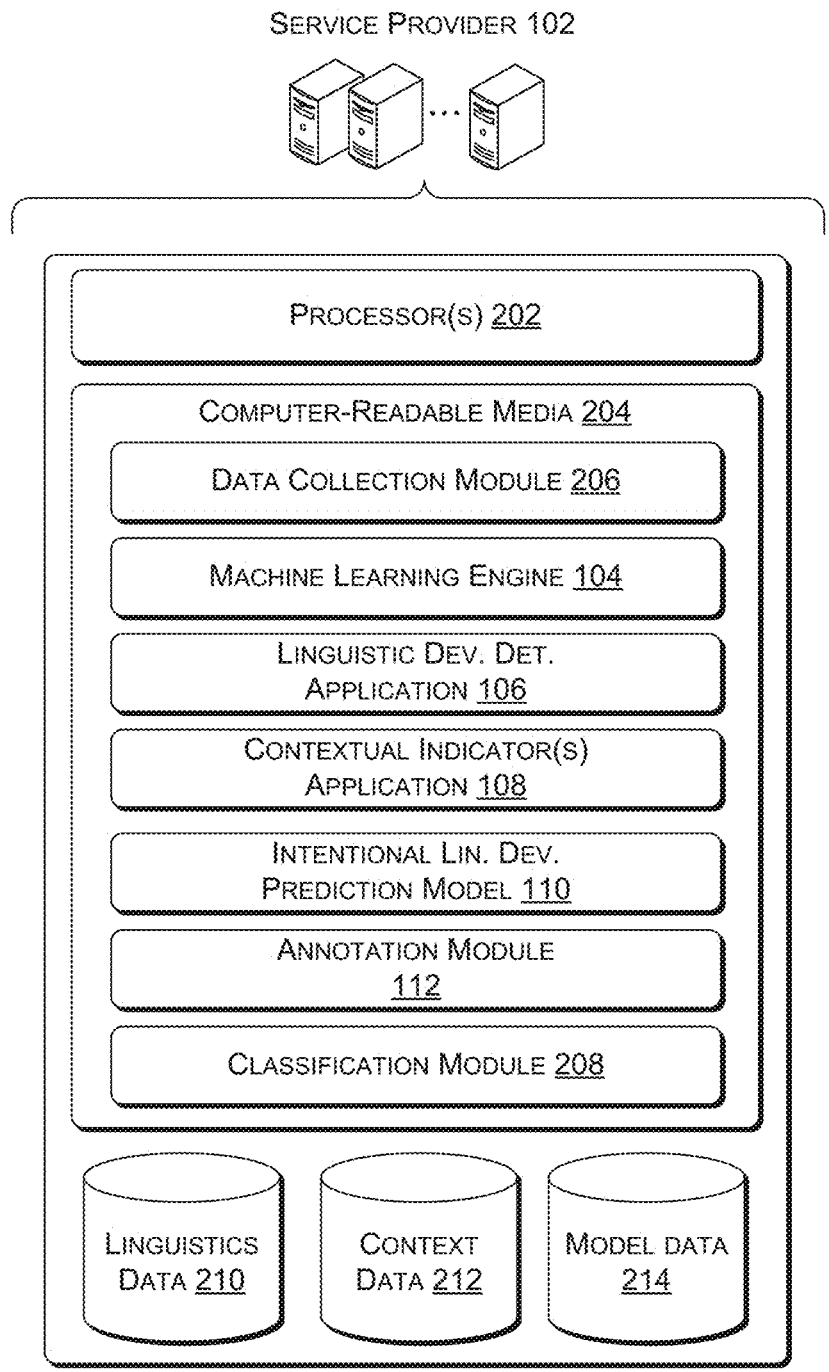
FIG. 2 is a block diagram of an illustrative computing architecture to distinguish intentional linguistic deviations from unintentional linguistic deviations using machine learning.

FIG. 2 is a block diagram of an illustrative computing architecture 200 to distinguish ILDs from ULDs using machine learning. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a data collection module 206, the machine learning engine 104, the LDD application 106, the contextual indicators application 108, the ILD prediction model 110, the annotation module 112, and a classification module 208, which are described in turn. The components may be stored together or in a distributed arrangement. The service provider 102 may also store or have access to linguistics data 210, contextual data 212, and model data 214, which may be stored locally and/or remotely.

The data collection module 206 may collect the past publications 116 and the corresponding HLD data and contextual data developed by the contextual indicator application 108. HLD data may be generated by the service provider 102, and/or received directly from the publisher(s) 114 (e.g. a publisher may indicate intentional misspellings in the publication 116), and/or received from devices associated with a plurality of users who may identify deviations and report them (and whether they are believed to be intentional or inadvertent). Thus, in various instances, the HLD data may come from any combination of publisher input, service provider analysis, and/or crowdsourcing of end consumers of the publications for the purpose of building upon training data. In some embodiments, the data collection module 206 may store some or all of the training data associated with identified ILDs and ULDs as well as data usable to perform linguistics analysis (e.g. electronic dictionaries and/or grammar rules) in the linguistics database 210, which may be accessed for analysis and for other reasons as discussed herein. For example, in additional to data identifying known instances of ILDs, the linguistics database 210 may also include a set of words or other text strings made for use by LDD application 106 to identify misspellings (and/or other types of deviations) in past or new publications. In some instances, the linguistics database 210 includes a set of grammatical and/or punctuation rules for use by the LDD application 106 to identify grammatical mistakes and/or punctuation mistakes in past or new publications. For example, referring back to hypo 2, it will be appreciated that a simple comparison of each individual word of hypo 2 to a set of known word spellings or known text strings might not recognize the two misuses of the word "two." Accordingly, in some instances, the LDD application 106 may access the set of grammatical and/or punctuation rules from the linguistics database 210 to perform any combination of spelling analysis, grammar analysis, or punctuation analysis on the past publications 116 in generating the ILD prediction model 110 and/or deploying the model 110 on the new publication 122. In some embodiments, the data collection module 206 may store some or all of the contextual data, e.g. information regarding indicators and/or corresponding rules developed by the contextual indicators application 108, in a context data 212. The context data 212 may include at least information associated with indicators which correlate with the intentional use of linguistic deviations by authors in publications.

The machine learning engine 104 may perform analytics, including statistical analytics, to assist in functions performed by one or both of the LDD application 106 or the contextual indicator application 108 and also for formation and maintenance of the ILD prediction model 108. For example, the machine learning engine 104 may determine updated information and later revise criteria for designating any particular observation from the surrounding context of a deviation (e.g. a word spelling which does not match a set of known word spellings, a grammatical mistake such as the incorrect usage of the word "two" in place of the word "to", or a punctuation mistake which humorously changes the meaning of a passage) based on samples from a larger population of publications or input from end consumers.

The machine learning engine 104 may determine various strengths of correlations between indicators and known ILDs to enable building or refining the ILD prediction model 108. Over time some indicators may become less (or more) correlated with an identified deviation being intentional, such as when the indicators become obsolete or are unused (e.g., are not as frequently used in publications). For example, the existence of a trendy product or phrase may cause others to refer to and/or mimic that product or phrase in literature and, therefore, indicators themselves may also become trending type indicators that will eventually diminish in weight (or become obsolete) in the ILD prediction model 110. For example, a company may release a product with an arbitrary prefix added to a generic and/or capitalized noun, e.g. an"iPhone"®. During the time period in which such a product is trending, the arbitrary prefix may be frequently mimicked in other contexts and, therefore, may be identified an intentional misspelling, e.g. the word "iLawnmower"® may be identified as a misspelling for not matching a word list but also as intentional for being a trendy variation of a known word. Therefore, the trending status of the "iPhone"® may cause an indicator corresponding to an "i" being pre-fixed onto a known and/or capitalized word to initially be a strong indicator of an intentional misspelling. However, the trendy product may become a passing fade, and thus become a mediocre or poor indicator at a later point in time. The machine learning engine 104 may, at times, revise and/or identify different indicators that have a strong correlation with a newly identified deviation as being an ILD. The machine learning engine 104 may revise, update, or create new weights for the indicators, at times, such as based on changes to the strength of the correlations over time. Thus, the machine learning engine 104 may, at times, perform additional analysis of data, such as the linguistics data 210 and context data 212 to leverage trends included in more recent data to improve the accuracy of the ILD prediction model 110 or at least prevent the accuracy of significantly being diminished due to changes in publisher and/or author behavior and/or by other factors.

In accordance with one or more embodiments, the contextual indicators application 108 may identify patterns associated with various types of ILDs and/or usage contexts thereof. Exemplary types and usage contexts of ILDs include, but are not limited:

Spacing Omissions/Replacements: In some instances, an author may intentionally omit one or more spaces between words of a phrase. For example, an author may write "Sarah exclaimed, 'ThisIsTheBestIdeaEver!!!'" for the purpose of conveying the excitement with which the character Sarah is making the statement. The machine learning engine 104 may recognize that it would be much more probable that the omission of several spaces in a row is intentional than somehow overlooked by the author. For similar reasoning, the machine learning engine 104 may identify the text "This_is_the_best_idea_ever" as an ILD.

Publication Specific/Publication Series Specific: In some instances, a publication may include a commonly themed ILD throughout a publication or series of related publications such as by including fictitious objects or words which, while not matching any real life word, have meaning within the publication. For example, a fictional story may describe a dangerous creature that has been genetically engineered for a theme park and may provide the dangerous creature with a fictitious name for use within the publication. Although the word may be flagged as a deviation for failing to match up with a dictionary type database, the frequency of use of the fictitious term may indicate the intentional nature of its use.

Patterned deviations: In some instances, an author may carry a patterned theme of deviations throughout a publication. For example, a story may include characters Harry and Sally whom pass letters and that Harry is using an old typewriter that is missing the lower case letter L. Accordingly, Harry may choose to replace each lower case L with the number 1 such that the salutation of each letter from Harry to Sally reads "Dear Sa11y" as opposed to "Dear Sally." The consistency with which lower case Ls are replaced with number 1s may indicate the intentional nature of these misspellings.

Dialogue-Centric Deviations: In some instances, an author may intentionally misspell words or deviate from particular grammar and/or punctuation rules when transcribing dialogue between characters of a publication. For example, in each of hypos 1 and 2, spelling and/or grammar deviations were included to convey information about the way a character was speaking or a level of intelligence of a character.

Fictional vs. Factual Publication: In some instances, the contextual indicator application 108 may recognize whether a publication is fictional or factual in nature and weigh this observation as an indicator of whether a misspelling and/or grammatical and/or punctuation mistake is intentional. For example, the machine learning engine 104 may determine that factual publications have historically included far less ILDs than fictional publications and that there is a high correlation with factual publications including the word "(sic)" immediately following any ILD. In contrast, fictional authors may use ILDs much more liberally for various reasons.

Phonetic Spelling: In some instances, an author may use a system of writing which has a correspondence between symbols and sounds or otherwise relates to phonetics. For example, the song lyrics from the popular Christmas song The Little Drummer Boy include the phonetically spelled lyrics of "Come they told me, Pa rum pum pum pum" which would are sounded out in singing the song.

Onomatopoetic Spelling: In some instances, an author may form a word by imitation of a sound of an object or action being referenced, i.e. the author may onomatopoetically spell out a sound. For example, a story may relate to a character being stranded in an inflatable life raft and may recite that "A wave come and crashed the raft into the wreckage. Thud . . . Scratch . . . . Fisst. Even over the howling wind Bob could hear the air slowly escaping." Although a spelling of "fisst" is typically a mistaken attempt to spell the word "fist," the machine learning engine 104 may determine from the surrounding context of the deviation (e.g. being preceded by the known onomatopoetic spellings of "Thud" and "Scratch") that the deviation of "fisst" is an ILD.

Repeated Letter Emphasis Spelling: In some instances, a letter may be repeated numerous times in a word to add emphasis. For example, an author may spell the word no as "Noooooooooooooo" or the word yes as "Yeeeeessssss" to emphasis that a character hung on certain syllables while speaking the word. Moreover, the determination of whether such a spelling is an ILD may depend on letter being repeated at least a certain amount, e.g. at least 3 times repeated. For example, the machine learning engine 104 may determine that historically when an author intends to include a repeated letter emphasis spelling the relevant letters are repeated, for example, at least 3 times or at least 4 times such that a spelling of "Noo" may be determined to be an ULD while the spelling of "Noooo" may be determined to be an ILD.

Of course, other types of linguistic deviations may also be recognized as ILDs and are within the scope of the present disclosure.

The contextual data 212 used by the contextual indicators application 108 to identify indicators to be factored into the ILD prediction model 110 may be limited to data associated with known ILDs having occurred within a predetermined amount of time, such as within a year, five two years, or within 10 years, etc. The predetermined amount of time may be determined by the machine learning engine 104 to prevent or minimize use of stale or outdated information. The machine learning engine 104 may account for genre variances related to changes in indicators and/or weights of indicators across genres such as, for example, comedy, drama, suspense, and romance. The machine learning engine 104 may account for formatting within the publications, e.g. a deviation identified within a uniquely indented portion of a book may be more likely to be an ILD. In various embodiments, contextual indicators application 108 may identify various contextual indicators as follows using an example algorithm.

The algorithm may identify as an indicator the presence of any one or more of the exemplary types and usage contexts of ILDs outlined above.

The algorithm may identify as an indicator the presence of a salutation within the surrounding context of a deviation. For example, upon identifying a linguistic deviation the contextual indicators application 108 may determine that the deviation is preceded by a known salutation (e.g. "Dear Madam" or "To Whom it May Concern" is identified shortly prior to the deviation). As this may indicate that the deviation has occurred within a dialogue portion of the publication that may increase the odds that the deviation is an ILD.

The algorithm may identify as an indicator the presence of unique formatting for a portion of publication in which a deviation is identified. For example, if a deviation is identified in a portion which is indented further in from the left and/or right margin that the preceding and/or subsequent portions of the publication then this may indicate that the deviation has occurred within a block quote, a fictional correspondence between characters, or other unique portion of the publication which an author may be more likely to include an ILD as opposed to other "normal" portions of the publication.

The algorithm may identify as an indicator the presence of an identified deviation elsewhere in a publication and/or associated series of publications and/or in other unrelated publications from the same author.

The algorithm may identify as an indicator a determination that an identified deviation is a proper noun. For example, despite the word "centraal" not corresponding to a particular linguistic database, the contextual indicators application 108 may determine that the plot of a publication includes travelling through Europe and that, therefore, the deviation of "Centraal Station" is likely in reference to the train station in Amsterdam. The contextual indicators application 108 may also identify as an indicator the capitalization of each word in a phrase containing a deviation, e.g. such capitalized word and/or phrases may be more likely to be ILDs.

The algorithm may identify as an indicator a linguistic deviation such as a misspelled word occurring in conjunction with a deviation from capitalization patterns and/or norms. For example, a misspelled word occurring in all capital letters may be more likely to be an ILD than the same misspelling occurring without any deviation in capitalization from the surrounding portions of the publication.

The algorithm may identify as an indicator deviation patterns such as similar but not identical types of misspelled words. For example, despite numerous words being misspelled and different than each other word, the contextual indicators application 108 may recognize a deviation pattern in the phrase "Aoccdrnig to a rscheearch at Cmabrigde Uinervtisy, it dseno't mtaetr in waht oerdr the ltteres in a wrod are, the olny iproamtnt tihng is taht the frsit and lsat ltteer be in the rghit pclae." Thus, the contextual indicators application 108 may recognize that while all the correct letters are present in each word, and that the words come together to form a grammatically correct sentence, the misspellings are ILDs because the letters are merely scrambled.

Of course, other types of usage contexts and/or patterns may also be recognized as indicators of a presence of one or more ILDs and are within the scope of the present disclosure.

The ILD prediction model 110 may be a model that predicts whether an identified deviation is an ILD or a ULD where many identifiers are included in the function, such as hundreds or thousands of identifiers. The model may include indicators and possibly weights for the indicators. The indicators may be variables that are populated by information from, or derived from, the linguistics data 210 and/or the contextual data 212. The ILD prediction model 110 may evolve over time, via updates, such as changes to indicators, changes to weights, and/or other changes. As discussed above, the machine learning engine 104 may determine a correlation of the linguistics data 210 and/or the contextual data 212 with an intentionality (or lack thereof) of deviations by processing data associated with many publications, and by updating the correlations over time. Thus, the machine learning engine 104 may determine identifiers and/or weights for use in the ILD prediction model 110, which may be stored in the model data 214.

Once created, the ILD prediction model 110 may use some of the linguistics data 210 and/or the contextual data 212 associated with specific publications as inputs to determine a ILD probability score that indicates a likelihood of any particular linguistic deviations being an ILD. For example, if an ILD probability score for a particular deviation is greater than a threshold score, then the ILD prediction model 110 may indicate that the particular deviation is likely an ILD.

The classification module 208 may associate a linguistic deviation with a classification. The classification may indicate a type of linguistic deviation, such as intentional or unintentional, a misspelling or a broken grammar and/or punctuation rule, a general deviation the indicators of which may apply across a wide variety of publications, a specific case deviation the indictors of which may apply only within a particular publication or a series of publication or in publication from a certain author, and/or other types of deviation attributes or deviation types. For example, the linguistic deviation may be classified as a specific case deviation such that corresponding indicators may result in an occurrence of the deviation to be determined to be an ILD when present in a particular series of publications or in a publication referring to that series while an occurrence of the deviation occurring in an unrelated context is determined to be an ULD. The classification may be used provide information to an end consumer (e.g. in the annotated version 122(A)) or to the publishers 114 in the report 124.

FIGS. 3-6 are flow diagrams of various illustrative processes in accordance with the present disclosure. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
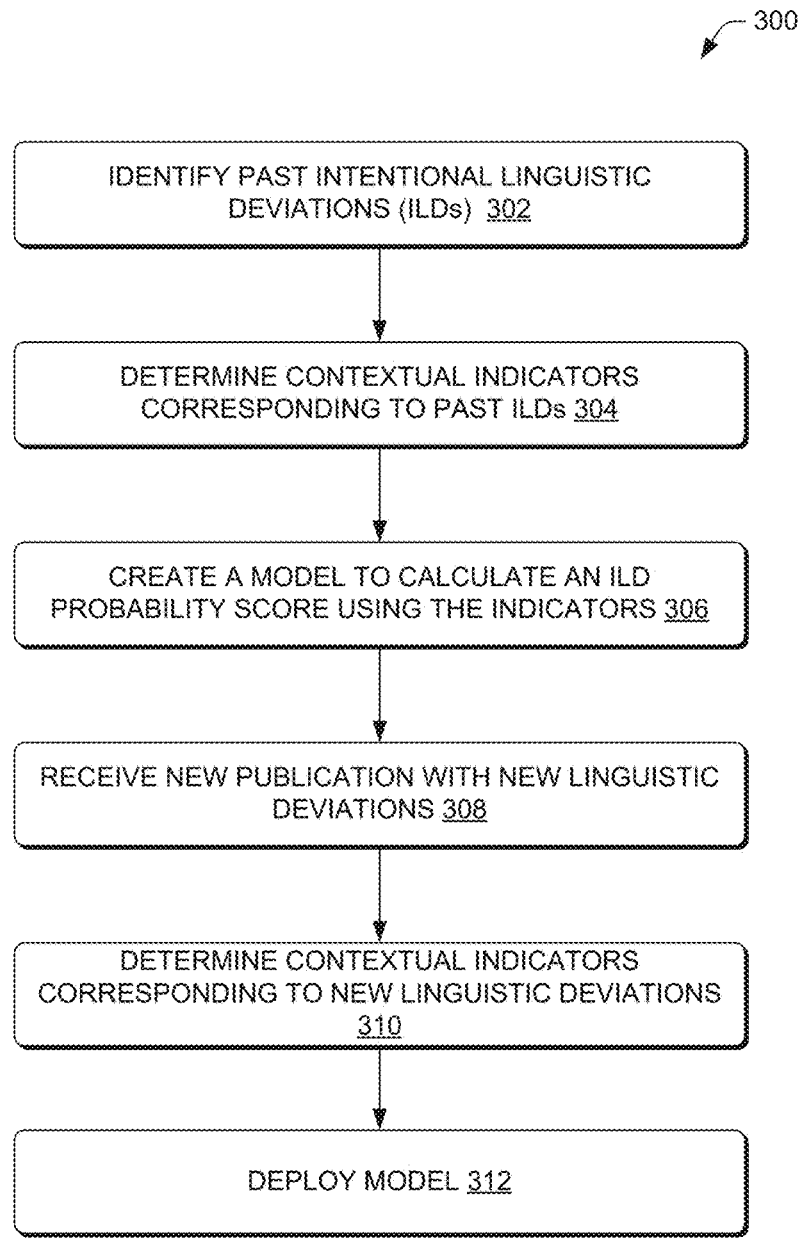
FIG. 3 is a flow diagram of an illustrative process to distinguish intentional linguistic deviations from unintentional linguistic deviations using machine learning.

FIG. 3 is a flow diagram of an illustrative process 300 to distinguish intentional linguistic deviations from unintentional linguistic deviations using machine learning. The process 300 is described with reference to the environment 100 and the computing architecture 200, and may be performed by the service provider 102.

At 302, a plurality of past ILDs may be determined. In some instances, the machine learning engine 104 may analyze past publications to identify linguistic deviations such as, for example, misspellings and/or deviations from rules of grammar. Once the deviations are identified, a human user may determine whether such deviations are intentional or unintentional and may indicate the determinations to the machine learning engine 104 to compile training data. In some instances, publishers 114 may provide the publications to the service provider 102 in a marked up state in which ILDs are flagged in some way, e.g. with metadata and/or with comments/special formatting in a word processing file type. The data may be selected as being within a predetermined time frame (e.g., data within last x number of days/months/years, etc.), thus removing stale data that may create inaccurate predictions.

At 304, the contextual indicators application 108 may determine contextual indicators that correspond to the known past ILDs from the training data. The contextual indicators may include any data that tends to indicate that a particular deviation is intentional in nature. In particular, if the presence (or absence) of any data would tend to increase or decrease the probability, even slightly, that a particular deviation was intentional, then that data may be an indicator. Although several exemplary indicators are discussed herein, this discussion forms only a non-exhaustive list of some examples that may be used in some instances and may not be used in other instances. It should be understood that the machine learning engine 104 may identify any number of other indicators depending on the specific data received. In some instances, the service provider 102 may perform validation of data used by the machine learning engine 104. For example, the service provider 102 may validate that particular identified ILDs are in fact intentional in nature such as, by requesting confirmation from an author or enlisting end consumers of the publications through crowd-sourcing.

At 306, the ILD prediction model 110 may be generated using compiling contextual indicators identified by the contextual indicators application 108 which correlate with the previous known ILDs. For example, if a strong correlation exists where a deviation is identified within a dialogue portion of a publication as determined by the deviation being located between quotation marks with the first words inside the quote being "Hey Bubba, . . . ," then these observations may be designated as an indicator for use in the ILD prediction model 110 since deviations may be commonly included to convey speech patterns in character building. However, many indicators may be less obvious than a linguistic deviation occurring within quotations.

In some embodiments, the ILD prediction model may be generated using the machine learning engine 104. For example, the machine learning engine 104 may identify the correlations and corresponding strengths of the correlations and generate a model or function to receive indicators as inputs and to output a prediction as to whether particular deviations are intentional or unintentional. In some implementations, the ILD prediction model 110 may be generated in part or in whole using heuristic techniques. For example, in at least some instances heuristic techniques may be used to define one or more rules to be applied to certain types of deviations. For example, in the context of a repeated letter emphasis spelling a heuristic rule may be developed which labels any misspelling with a letter repeated 3 or more times as an ILD or, more specifically in this instance an intentional. In some instances, a second heuristic rule may be developed which labels any misspelling with a letter repeated only once or twice as an unintentional misspelling. Another exemplary heuristic rule may be to flag any identified curse word for human review to determine an intentional nature thereof or, in some instances, to automatically flag any curse word or other likely offensive term for removal. Furthermore, in some instances, one or more heuristic rules may be formed into a type of decision tree to make several successive determinations prior to taking a prescribed action. For example, a first heuristic rule may as whether a publication is a children's book and, if so, may apply children's book specific rules such as deleting or flagging all curse words whereas in a non-children's book such a rule may be inapplicable.

In some instances, the ILD prediction model may be a multi-layered model which relies partially on heuristic rules and partially on the machine learning engine 104. For example, one or more heuristic rules may be applied to some deviations identified in a new publication whereas other deviations may be labelled as intentional or unintentional based on machine learning techniques described elsewhere herein.

At 308, a new publication 122 may be received that includes new linguistic deviations, e.g. deviations which have yet to be examined by the service provider 104 and/or machine learning engine 104. The new publication 122 may be received via a network 126 or may be received alternate means. For example, the new publication 122 may be physically mailed, e.g. by a postal service, to the service provider 104 on one or more non-volatile storage devices such as a flash drive. In some instances, the new linguistic deviations are unknown to one or both of the publisher 114 and/or the service provider 102 when the new publication is received by the service provider 102 at block 308.

At 310, the contextual indicators application 108 may analyze the new publication 122 to determine which contextual indicators, e.g. as identified at 304, are present within the new publication 122. For example, the contextual indicators application 108 may analyze the surrounding context of each newly identified deviation and, from the surrounding context, identify the presence of known indicators. In some instances, for each deviation that is identified in a new publication, the contextual indicators application 108 may run through essentially a checklist as it attempts to identify similarities of context between the new publication 122, and more particularly the new deviations, and the known past ILDs.

At 312, the ILD prediction model 110 may be deployed for use in predicting, for the individual new deviations, whether the deviations are intentional or not. For example, the ILD prediction model 110 may be usable to receive as inputs any indicators identified at 310 with respect to any particular deviation and may then generate an ILD probability score based on inputs of indicators received for the individual deviations. The ILD probability score may indicate whether or not a deviation is likely to be an ILD or a ULD.

Figure 4:
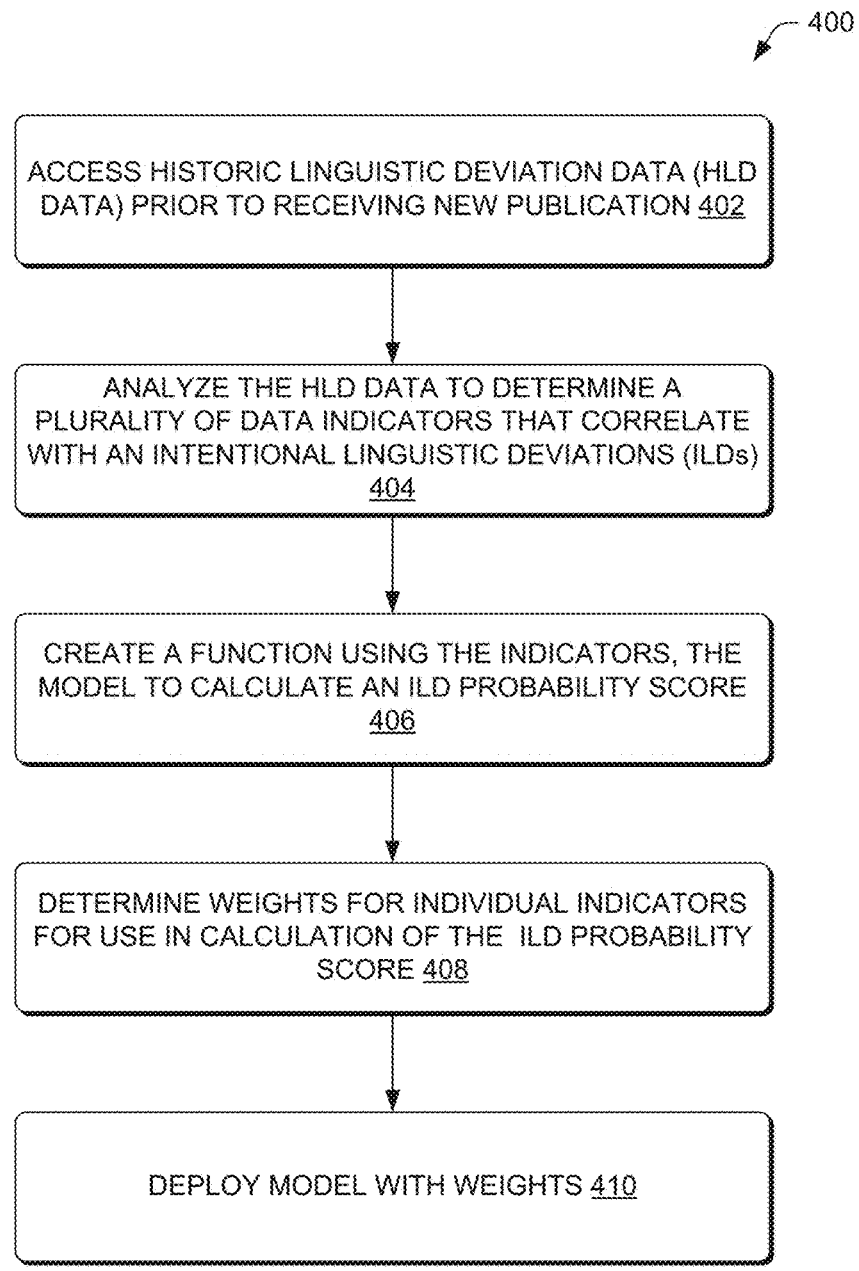
FIG. 4 is a flow diagram of an illustrative process to distinguish intentional linguistic deviations from unintentional linguistic deviations using a model with various weighting factors for various contextual indicators.

FIG. 4 is a flow diagram of an illustrative process 400 to distinguish intentional linguistic deviations from unintentional linguistic deviations using a model with various weighting factors for various contextual indicators. The process 500 is described with reference to the environment 100 and the computing architecture 200, and may be performed by the service provider 102.

At 402, machine learning engine 104 may access historical linguistic deviation data (HLD data) prior to receiving a new publication 122, which may be used as training data to develop the ILD prediction model 110. For example, the machine learning engine 104 may access at least some of the data associated with operations 302 and/or 304 in the process 300. The HLD data may be associated with past ILDs and/or ULDs and may also include corresponding contextual information such as, for example, spelling data and/or punctuation data and/or indentation data.

At 404, the machine learning engine 104 may analyze the HLD data to determine a plurality of data indicators that correlate with and intentional nature or unintentional nature of past deviations, e.g. indicators of a past known intentionally misspelled word. For example, machine learning engine 104 may employ bootstrap regressions to obtain robust significant predictors to target in multilinear regression form. The machine learning engine 104 may process data associated with multiple different ILDs and/or multiple different ULDs to determine common and highly correlated indicators. In some instances, such correlated indicators may be either positively correlated with a probability of a deviation being intentional (e.g. the presence of the indicator makes it at least slightly more likely that the deviation is intentional) or positively correlated with a probability of a deviation being intentional (e.g. the presence of the indicator makes it at least slightly less likely that the deviation is intentional).

At 406, the machine learning engine 104 may create or assist in creation of the ILD prediction model 110 which may be expressed as a function. The ILD prediction model 110 may generate an ILD probability score that is indicative of a likelihood that a deviation is intentional. The ILD prediction model 110 may use indicators identified as being associated with particular deviations as inputs to the function, which may then create the ILD probability score. In some implementations, the function may be calculated iteratively with respect to the publication, e.g. several times at various times for the same publication, as the model is updated with new information as will be discussed below. Thus, even publications which have already been released to the public may be continuously improved upon in terms of quality. In some instances, identification of a newly identified ILD or ULD subsequent to a publication having been released may result in a versioning of the publication. In some instances, the new version is distributed to consumers from that point forward while previously distributed copies remain unchanged. In some instances, the new version of a publication may be electronically "pushed" to the device 120 with or without the knowledge of the user 118.

At 408, the machine learning engine 104 may determine weights for individual indicators that apportion the influence of the indicators in calculation of the ILD probability score. The weights may be included in the ILD prediction model 110 as part of the function. For example, the weights may be created to reflect the strength of the correlation of indicators. The weights may also be based at least partly on the frequency of occurrence of some indicators. For example, a deviation occurring within a quotation beginning with an informal salutation, e.g. "Hey Bubba, . . . ," may be a strong indicator that deserves a relatively heavy weight whereas some other indicator may be weaker and deserving of relatively less weight. Some functions or models may not use weights whatsoever, e.g. influence of indicators may be un-apportioned.

At 410, the relocation prediction model 110 may deploy the function for use with current data identified in a new publication. For example, the machine learning engine 104 may analyze a new publication 122 along with corresponding new contextual data to identify indicators as described with respect to operation 310. Due to the potentially varying correlative strengths of the newly identified indicators, the deployed function may discount (or mark-up) the importance of certain observed indicators over other observed indicators.

Figure 5:
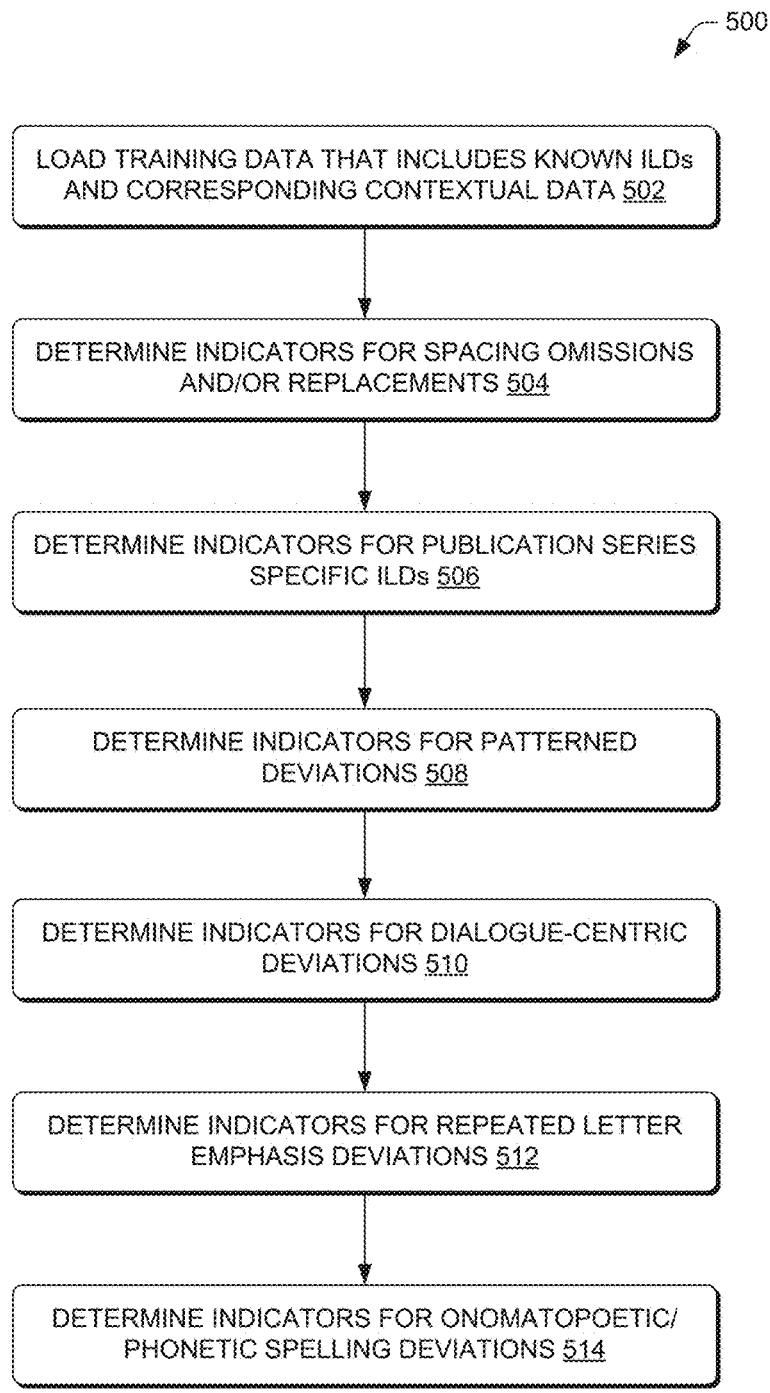
FIG. 5 is a flow diagram of an illustrative process of analyzing training data to identify a variety of contextual indicators associated with intentional linguistic deviations.

FIG. 5 is a flow diagram of an illustrative process 500 of analyzing training data to identify a variety of contextual indicators associated with intentional linguistic deviations. The process 500 is described with reference to the environment 100 and the computing architecture 200, and may be performed by the service provider 102.

At 502, the machine learning engine 104 may load training data that includes known ILDs and contextual data that corresponds to the known ILDs and from which various indicators may be determined. For example, the training data may include a plurality of publications in an electronic format that includes computer readable character strings and indentation data. The training data may include linguistic deviations which are flagged as either ILDs and/or ULDs such that machine learning engine may recognize deviations and also whether such deviations are intentional or not.

At 504, the machine learning engine 104 may determine indicators having a correlation to intentional omissions of one or more spaces in between a string of words. For example, as discussed above, an author may write "Sarah exclaimed, 'ThisIsTheBestIdeaEver!!!'" for the purpose of conveying the excitement with which the character Sarah is making the statement. The machine learning engine 104 may recognize that it would be much more probable that the omission of several spaces in a row is intentional than somehow overlooked by the author. For similar reasoning, the machine learning engine 104 may identify the text "This_is_the_best_idea_ever" as an ILD. In some instances, the machine learning engine 104 may analyze individual words within an ILD phrase to identify whether a ULD is inadvertently included within an ILD. For example, an author may write "ThisIzTheBeastIdeaEver!!!" (bold included for clarity only) and the machine learning engine 104 may determine that while the phrase as a whole is an intentional spacing omission type ILD, the misspelled words of "Iz" and "Beast" are unintentional misspellings of the words "Is" and "Best." Thus, one or more ULDs may be present within one or more ILDs and vice versa. In some embodiments, when multiple indicators are determined to correlate with a deviation being an intentional spacing omission/alteration type ILD, the machine learning engine 104 may determine weights for each to apportion influence of the indicators.

At 506, the machine learning engine 104 may determine indicators associated with publication series specific ILDs. For example, the machine learning engine 104 may recognize a correlation between an author name and/or the presence of one or more characters with the presence of an ILD that is a fictitious object from a series of publications. For example, suppose that an existing trilogy of publications includes a fictitious animal that terrorizes a youth ocean front summer camp, e.g. a mutant hybrid between a bear, a shark, and an octopus coined by the author as a "barktipus." Because the word "barktipus" is fictitious, e.g. not existing in the real world, it would generally be unlisted in a database of known words and, therefore, may be identified as a deviation. However, the machine learning engine 104 may determine the author and/or one or more characters of publications which include this word as an ILD. Thus, in subsequent publications including this word, a determination that the publication is by the same author and/or includes at least some of the same characters may be an indicator that the deviation is an ILD. In some instances, the machine learning engine 104 may, upon identifying the deviation of "barktipus," may determine whether the word is being used in reference to the existing trilogy even if it is not itself a part of the trilogy. For example, the machine learning engine 104 may search the new publication containing the deviation for references to the author and/or one or more titles of the existing trilogy. In some embodiments, when multiple indicators are determined to correlate with a deviation being a publication series specific ILD, the machine learning engine 104 may determine weights for each to apportion influence of the indicators.

At 508, the machine learning engine 104 may determine indicators associated with patterned type ILDs. For example, the machine learning engine 104 may recognize one or more patterns which recur within a plurality of deviations such that the existence of the pattern reduces the statistical probability that the deviations containing the pattern are inadvertent. For example, in a publication containing numerous correspondence between characters of the publication in which a particular character is universally replaced with a different character, the statistical probability that each instance of the universal replacement is inadvertent is likely to be very low. For example, if the exact phrase of "Dear Sally" (note that the presence of two number 1s as opposed to two lower case letter Ls) shows up in a publication dozens of times whereas the phrase "Dear Sally" (note the two lower case letter Ls) does not show up at all, then the machine learning engine 104 may determine that the probability of inadvertently typing the number 1 in place of the letter L (which may already be low due to the distance between these keys) numerous times in a nearly uniform fashion forms a pattern type indicator of a ILD. In some embodiments, when multiple indicators are determined to correlate with a deviation being a patterned type ILD, the machine learning engine 104 may determine weights for each to apportion influence of the indicators.

At 510, the machine learning engine 104 may determine indicators associated with deviations being dialogue-centric. For example, the machine learning engine 104 may determine that deviations occurring within quotations are more likely to be intentionally included to convey information and/or add effect as to how a character is speaking during a spoken dialogue, e.g. an author may phonetically or onomatopoetically spell out a character's southern accent. In some instances, the machine learning engine 104 may determine indentation data associated with a deviation to determine whether the deviation is included within dialogue. For example, the machine learning engine 104 may identify whether a deviation is included within a portion of a publication which is indented from the left further than the other surrounding portions of the publication use this observation as an indicator as to whether the deviation is a part of a dialogue, e.g. an author may indent dialogue differently than other portions of the publication. In some embodiments, when multiple indicators are determined to correlate with a deviation being a dialogue-centric ILD, the machine learning engine 104 may determine weights for each to apportion influence of the indicators.

At 512, the machine learning engine 104 may determine indicators associated with a deviation being a repeated letter type ILD and/or a repeated letter type ULD. For example, the machine learning engine 104 may determine that a deviation that includes a single letter repeated only once indicates that the deviation is an ULD while if the same letter were to be repeated two or more times this would indicate the deviation to be an ILD. In particular, the machine learning engine 104 may, in some instances, determine that an author is more likely to have intentionally repeated a letter 4 or 7 times than once since such deviations would be both more conscious to the author's and/or editor's eye and that it is easier to inadvertently re-type a letter once than 3 or 6 additional times. In some embodiments, when multiple indicators are determined to correlate with a deviation being a repeated letter type ILD and/or ULD, the machine learning engine 104 may determine weights for each to apportion influence of the indicators.

At 514, the machine learning engine 104 may determine indicators associated with a deviation being an intentional onomatopoetic spelling and/or an intentional phonetic spelling. For example, the machine learning engine 104 may scan around a deviation for the presence of known common onomatopoetic spellings such a "thud" and "scratch" and may determine that the presence of a deviation within X number of words of these known onomatopoetic spellings may indicate that the deviation itself is more likely to itself be an onomatopoetic spelling. In some embodiments, when multiple indicators are determined to correlate with a deviation being an intentional onomatopoetic spelling and/or an intentional phonetic spelling, the machine learning engine 104 may determine weights for each to apportion influence of the indicators.

Figure 6:
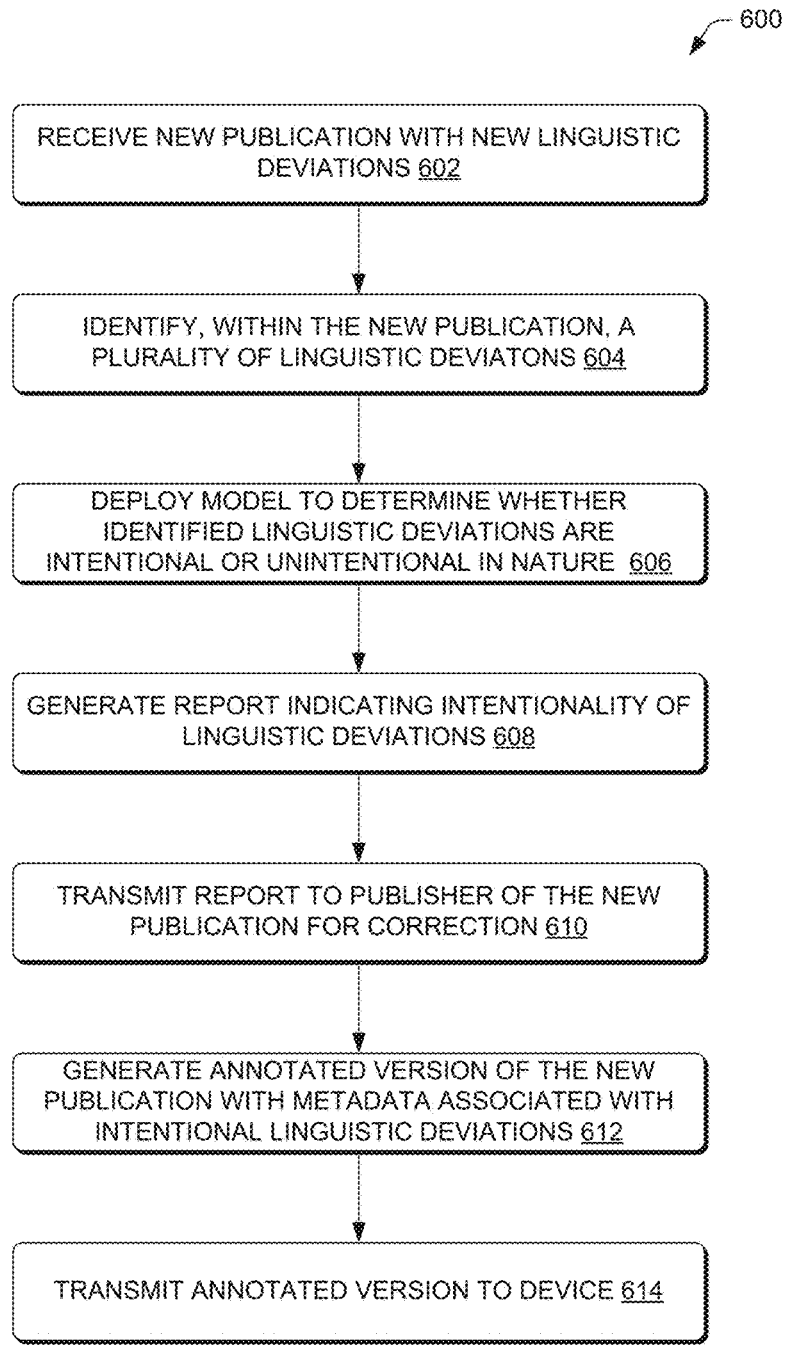
FIG. 6 is a flow diagram of an illustrative process of deploying a model to identify intentional linguistic deviations and unintentional deviation and to create a report and/or an annotated version of the publication based on the results of deploying the model.

FIG. 6 is a flow diagram of an illustrative process of deploying a model to identify intentional linguistic deviations and unintentional deviation and to create a report and/or an annotated version of the publication based on the results of the deploying the model. The process 600 is described with reference to the environment 100 and the computing architecture 200, and may be performed by the service provider 102.

At 602, the service provider 102 may receive a new publication 122. For example, the service provider 102 may receive the new publication via a network 126 or by alternate means as described with respect to operation 308.

At 604, the service provider 102 may analyze the newly received publication to identify a plurality of linguistic deviations. For example, the service provider 102 may deploy the LDD application 106 with respect to the new publication that may identify a plurality of misspellings, a plurality of deviations from a set of grammatical rules, a plurality of deviations from a set of punctuation rules, or any combination thereof. The LDD application 106 may flag the identified deviations for contextual analysis.

At 606, the service provider 102 may deploy the model described elsewhere herein to determine whether individual deviations identified at 604 are intentional in nature. For example, the service provider 102 may deploy the model to calculate an ILD probability score for individual ones of the deviations and flag deviations having an ILD probability score above a threshold as ILDs. In some instances, the service provider 102 may also flag deviations having an ILD probability score below the threshold (or a second threshold that is different) as ULDs.

At 608, the service provider 102 may generate a report that indicates an intentionality of the linguistic deviations identified at operation 604. For example, the service provider 102 may generate a marked-up version of the publication which indicates the identified ULDs without indicating the identified ILDs. Thus, the service provider 102 may generate a report with the aim of it not being over-inclusive in the sense of reporting intentional deviations. In some instances, the service provider 102 may generate a report that indicates all deviations identified at operation 604 along with the corresponding labels (e.g. ILD or ULD) determined at operation 606.

At 610, the service provider 102 may transmit the report to the publisher for correction of any identified deviations and especially any identified ULDs. For example, the service provider 102 may transmit the report to the publisher via the network 126 with a request that the report be reviewed and any appropriate corrections be entered.

At 612, the service provider 102 may generate an annotated version 122(A) of the new publication 122 which includes metadata associated with the ILDs. For example, the metadata may cause the ILDs to be uniquely displayed by the device 120 to visually indicate to the user 118 the unique nature of the ILDs. In some instances, a user may select the flagged ILDs (e.g. by touching the ILDs upon a touch screen or applying some other input to the device 120) to cause the device 120 to display information associated with the metadata. For example, a user may select an underlined ILD and the device may respond by displaying the reasoning as to why the deviation was flagged as intentional.

At 614, the service provider 102 may transmit the annotated version 122(A) to the device 120 for consumption by the user 118.

It will be appreciated that an object of the disclosure is to dramatically improve conventional spelling and/or grammar checking systems with respect to electronic documents, such as eBooks. Conventional electronic spelling and/or grammar checking systems are merely able to apply a set of predefined rules uniformly across an electronic document to identify spelling errors. Because the rules are applied uniformly, conventional electronic spelling and/or grammar checking systems are completely unconcerned with, and unable to determine, whether a particular identified linguistic deviation is intentional or inadvertent. Accordingly, the results provided by conventional electronic spelling and/or grammar checking systems are inherently over inclusive in that they report on and/or automatically correct both unintentional deviations as intended but also intentional deviations which should neither be reported on or corrected. In contrast to conventional systems, the present disclosure employs numerous unconventional techniques to leverage existing spelling/grammar check systems where appropriate while simultaneously disregarding the same based on historical instances of authors intentionally deviating therefrom.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining, based at least in part on contextual data associated with one or more past publications, a plurality of indicators, wherein at least an indicator of the plurality of indicators correlates with a past intentional linguistic deviation (ILD) included within the one or more past publications;
   determining a weighting factor associated with the indicator;
   generating, using the plurality of indicators and the weighting factor, an ILD prediction model to determine an ILD probability score based at least in part on an occurrence of the indicator in association with a new linguistic deviation included within a new publication;
   determining new contextual data associated with the new linguistic deviation, the new contextual data including at least the indicator;
   determining, using the ILD prediction model, and based at least in part on the new contextual data and the weighting factor, the ILD probability score for the new linguistic deviation;
   determining that the ILD probability score exceeds a threshold score;
   determining that the new linguistic deviation is a new ILD based at least in part on the ILD probability score exceeding the threshold score; and
   generating a linguistic deviation report for the new publication, wherein the linguistic deviation report omits an indication of the new ILD.

2. The method as recited in claim 1, further comprising:
   determining second contextual data associated with a second linguistic deviation included within the new publication, the second contextual data including at least a second indicator that correlates with an unintentional linguistic deviation (ULD) included within the one or more past publications;
   determining, based at least in part on the second contextual data, a second ILD probability score for the second linguistic deviation; and
   determining that the second ILD probability score is below the threshold score,
   wherein the linguistic deviation report indicates a presence of the second linguistic deviation within the new publication.

3. The method as recited in claim 2, further comprising sending the linguistic deviation report to a device.

4. The method as recited in claim 2, further comprising identifying the new ILD as at least one of:
   a phonetic spelling;
   an onomatopoetic spelling; or
   a repeated letter emphasis spelling.

5. The method as recited in claim 1, further comprising determining that the new ILD corresponds to a proper noun associated with the new contextual data.

6. The method as recited in claim 1, further comprising determining that the new contextual data includes at least frequency data indicating a frequency of the new ILD occurring within the new publication, and wherein the ILD probability score is further based at least in part on the frequency of the new ILD.

7. The method as recited in claim 1, further comprising determining a publication series specific linguistic deviation corresponding to a subset of the one or more past publications, the subset corresponding to at least one of an author or a series of related publications, wherein determining the ILD probability score is further based at least in part on a determination that the new linguistic deviation corresponds to at least one of the author or the series of related publications.

8. The method as recited in claim 7, wherein determining the publication series specific linguistic deviation comprises determining that the publication series specific linguistic deviation is associated with at least one of a fictitious language corresponding to the subset or a fictitious object corresponding to the subset.

9. The method as recited in claim 1, wherein the indicator comprises a first indicator and the weighting factor comprises a first weighting factor, and wherein the method further comprises:
   determining, for the plurality of indicators, a second weighting factor corresponding to a second indicator of the plurality of indicators,
   wherein determining the ILD probability score is further based at least in part on applying the second weighting factor to the second indicator.

10. A system comprising:
one or more processors; and
one or more computer-readable media storing instructions that, when executed by the one or more processors, cause the one or more processors to perform operations comprising:
   determining, based at least in part on contextual data associated with one or more past publications, a plurality of indicators, wherein at least an indicator of the plurality of indicators correlates with at least a past intentional linguistic deviation (ILD) included within the one or more past publications;
   determining at least a weighting factor associated with the indicator;
   generating an ILD prediction model to determine an ILD probability score based at least in part on an occurrence of the indicator in association with a new linguistic deviation included within a new publication;
   determining new contextual data associated with the new linguistic deviation, the new contextual data including at least the indicator;
   determining, using the ILD prediction model, and based at least in part on the new contextual data and the weighting factor, the ILD probability score for the new linguistic deviation;
   determining that the ILD probability score exceeds a threshold score that indicates that the new linguistic deviation is a new ILD; and
   generating a linguistic deviation report for the new publication, wherein the linguistic deviation report omits an indication of the new ILD.

11. The system as recited in claim 10, the operations further comprising:
   determining second contextual data associated with a second linguistic deviation included within the new publication, the second contextual data including at least a second indicator that correlates with an unintentional linguistic deviation (ULD) included within the one or more past publications;
   determining, based at least in part on the second contextual data, a second ILD probability score for the second linguistic deviation; and
   determining that the second ILD probability score is below the threshold score,
   wherein the linguistic deviation report indicates a presence of the second linguistic deviation within the new publication.

12. The system as recited in claim 11, the operations further comprising sending the linguistic deviation report to a device.

13. The system as recited in claim 10, the operations further comprising determining that the new ILD corresponds to a proper noun associated with the new contextual data.

14. The system as recited in claim 10, the operations further comprising determining that the new contextual data includes at least frequency data indicating a frequency of the new ILD occurring within the new publication, and wherein the ILD probability score is further based at least in part on the frequency of the new ILD.

15. The system as recited in claim 10, the operations further comprising determining a publication series specific linguistic deviation corresponding to a subset of the one or more past publications, the subset corresponding to at least one of an author or a series of related publications, wherein determining the ILD probability score is further based at least in part on a determination that the new linguistic deviation corresponds to at least one of the author or the series of related publications.

16. The system as recited in claim 15, wherein the publication series specific linguistic deviation is associated with at least one of a fictitious language corresponding to the subset or a fictitious object corresponding to the subset.

17. The system as recited in claim 10, wherein the indicator comprises a first indicator and the weighting factor comprises a first weighting factor, and wherein the operations further comprise:
   determining, for the plurality of indicators, a second weighting factor corresponding to a second indicator of the plurality of indicators,
   wherein determining the ILD probability score is further based at least in part on applying the second weighting factor to the second indicator.

18. The system as recited in claim 10, wherein the new ILD is at least one of:
   a phonetic spelling;
   an onomatopoetic spelling; or
   a repeated letter emphasis spelling.

19. A method comprising:
   determining, based at least in part on contextual data associated with one or more past publications, a plurality of indicators, wherein a first indicator of the plurality of indicators correlates with a past intentional linguistic deviation (ILD) included within the one or more past publications and a second indicator of the plurality of indicators correlates with a past unintentional linguistic deviation (ULD) included within the one or more past publications;
   determining a first weighting factor associated with the first indicator;
   determining a second weighting factor associated with the second indicator;
   identifying a new linguistic deviation included within a new publication;
   determining new contextual data associated with the new linguistic deviation, wherein the new contextual data includes at least the first indicator;
   utilizing an ILD prediction model to determine, based at least in part on the new contextual data and the first weighting factor, a score for the new linguistic deviation;
   determining that the score exceeds a threshold score;
   determining that the new linguistic deviation is a new ILD; and
   generating a linguistic deviation report for the new publication, wherein the linguistic deviation report omits an indication of the new ILD.

20. The method as recited in claim 19, further comprising:
   determining second contextual data associated with a second linguistic deviation included within the new publication, the second contextual data including at least the second indicator;
   determining, based at least in part on the second contextual data and the second weighting factor, a second score for the second linguistic deviation; and
   determining that the second score is below the threshold score,
   wherein the linguistic deviation report indicates a presence of the second linguistic deviation within the new publication.

* * * * *